United States Patent [19]
Stobart

[11] 3,858,802
[45] Jan. 7, 1975

[54] FLUID HEATING SYSTEM

[76] Inventor: Andrew Ferrand Stobart, The Old Hall, Kilsby, near Rugsby, England

[22] Filed: Oct. 3, 1972

[21] Appl. No.: 294,549

[30] Foreign Application Priority Data
Oct. 5, 1971  Great Britain .................... 46347/71
Nov. 11, 1971  Great Britain .................... 52515/71
Mar. 1, 1972  Great Britain ....................... 9632/72

[52] U.S. Cl. ......................... 237/12.1, 62/6, 62/243
[51] Int. Cl. ............................................... B60h 1/00
[58] Field of Search ............. 237/12.3 B, 2 B, 12.1, 237/1 R; 62/6, 243; 165/43

[56] References Cited
UNITED STATES PATENTS
2,468,293  4/1949  Du Pre .................................. 60/24 X
2,806,358  9/1957  Jacobs .................................. 62/243
2,909,902  10/1959  Newton ............................... 60/24 X
3,259,317  7/1966  Aronson et al. ................... 237/12.1
3,550,371  12/1970  Jaspers ...................................... 62/6

*Primary Examiner*—Edward G. Favors
*Attorney, Agent, or Firm*—Dowell & Dowell

[57] ABSTRACT

A fluid heating system primarily for central heating systems in which substantially all of the output energy from a combustion engine is utilised by driving a heat pump with the engine, and passing the fluid through the engine cooling system to absorb "waste" heat as well as through the heat pump, in which it absorbs heat from the atmosphere. Since a larger proportion of the "waste" output energy of a Stirling external combustion engine goes into the cooling fluid rather than the exhaust gases, this type of engine is used in the preferred forms of the invention.

6 Claims, 7 Drawing Figures

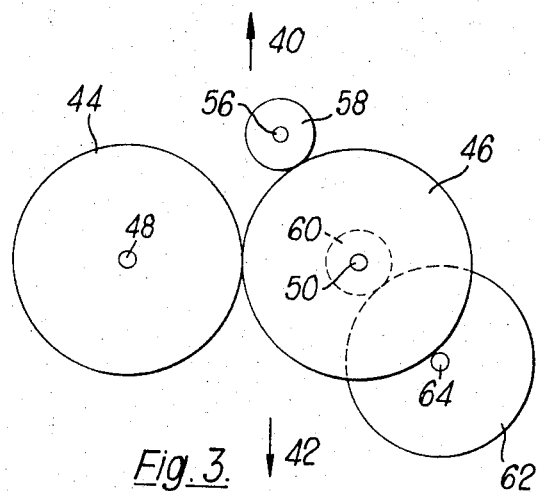
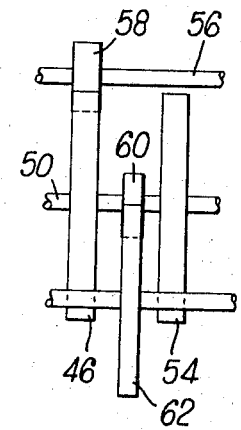
Fig. 3.
Fig. 4.
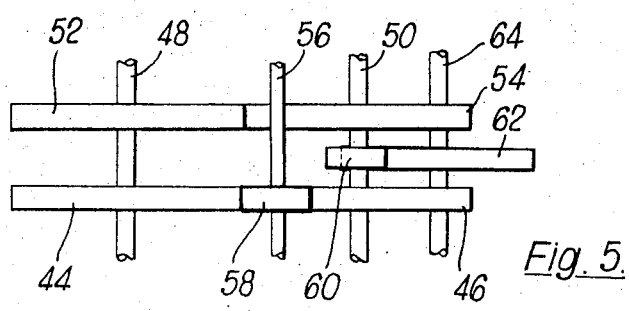
Fig. 5.
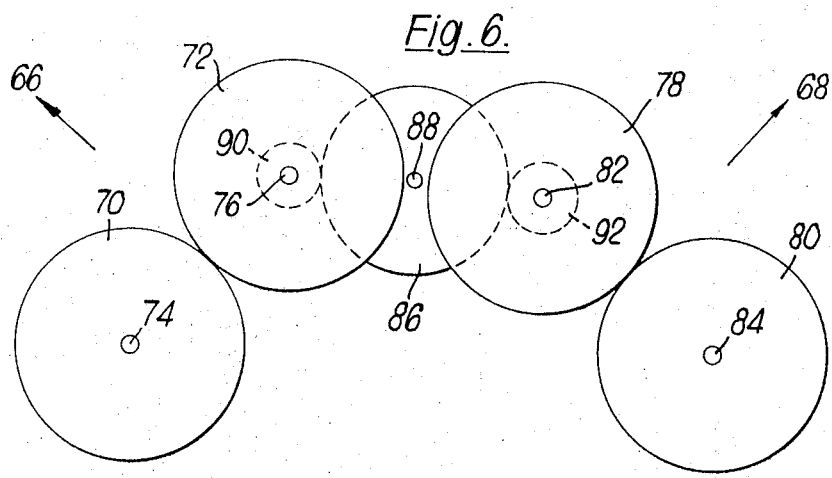
Fig. 6.

FLUID HEATING SYSTEM

This invention relates to fluid and space-heating systems for industrial, domestic or other purposes.

A method of heating fluid according to the invention comprises driving a heat pump by means of a fluid-cooled motor or engine arranging the heat pump to transfer heat from a working medium to a fluid, and also passing the fluid through the cooling system of the said motor or engine, so that waste heat from the engine is transferred to the fluid. The fluid can then be circulated in a space-heating system.

Apparatus in accordance with the invention for carrying out this method comprises a fluid-cooled engine drivingly connected to a heat pump, the fluid being arranged to circulate through both the heat pump so as to absorb heat from the working medium thereof, and the cooling system of the engine.

Preferably the fluid is arranged to pass through the heat pump first, so as to absorb heat from the working medium of the pump and then to pass through the engine cooling system. Alternately the fluid may be passed through the cooling system of the engine first, and then through the heat pump. This arrangement can improve the efficiency of the engine.

Preferably the engine is of the external combustion type and in particular a "Stirling" hot gas engine is preferred because a large portion of the "waste" heat in this type of engine is passed to the cooling fluid rather than the exhaust and so adds to the efficiency of the whole apparatus of the invention. This type of engine offers the additional advantage on that it can be adapted to run on many different types of fuel, which renders the system suitable for use in widely different environments.

The heat pump may also be one which utilises the "Stirling refrigeration cycle" although other types of heat pump or refrigerating unit may also be used.

According to a further feature of the invention, the engine cylinder or cylinders may share a common crankcase with the heat pump cylinder or cylinders, the drive between the engine and heat pump also being incorporated in the crankcase.

This arrangement is particularly advantageous when both devices are of the 'Stirling' type. The drive-connection between the engine and the heat pump may be of the conventional type including a normal crankshaft, or may include a 'rhombic' drive of the kind used in the Philips Stirling engine, and described in British Pat. No. 762731.

A number of arrangements of cylinders may be used. For example, each cylinder or bank of cylinders of the engine may be horizontally opposed to a cylinder or the bank of cylinders of the heat engine, or a 'vee' configuration may be employed, or a large unit may be built up having a radical configuration as in a radial aircraft engine.

In the case of a single cylinder engine driving a single cylinder heat pump, each having a rhombic drive linkage, a pair of drive shafts can be common to both drives and the cylinders arranged in a generally "opposed" configuration. Gear wheels for synchronising the rotation of the piston and displacer shafts in each device may be attached to the shafts so as to be common to both devices, or separate gear wheels may be provided in each device in which case, in this configuration, they will be in face-to-face relationship.

Other configurations, in which the piston rods of the cylinders of the engine and heat pump respectively are at various angles to one another, can conveniently be constructed either with one shaft of the rhombic drives being common to both, or with an auxiliary shaft connecting them, by means of gears engaging with the periphery of the synchronising gears or "timing wheels" of the rhombic drives. The auxiliary shaft may be arranged to run at suitable speed to operate a generator for electricity, either purely as a supply for the auxiliary control devices of the apparatus, or for other purposes.

Various configurations of the apparatus may be built up by linking together by the cylinders in combinations of the ways outlined above, and it will be realised that any number of cylinders may be employed.

The heat which is transferred to the fluid by the heat pump must of course be obtained from the atmosphere external to the space or fluid being heated and thus "cold" is returned to the atmosphere, and may be used for cooling purposes, at the other side of the heat pump.

Various embodiments of the invention will now be described by way of example with reference to the accompanying drawings, in which:

FIG. 3 shows a diagrammatic plan view of a rombic drive gear connection for a "horizontally opposed" engine/heat pump system;

FIG. 4 shows a side view of the apparatus of FIG. 3;

FIG. 5 shows an end view of the apparatus of FIG. 4;

FIG. 6 shows a diagrammatic side elevation of a rombic drive gear correction for a "vee" configuration apparatus.

Figure 1:
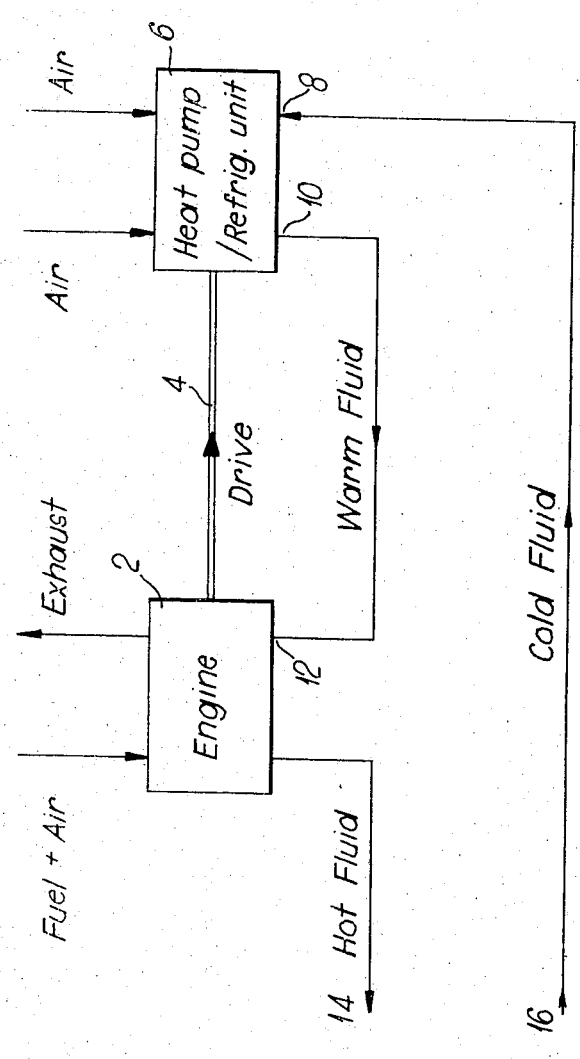
FIG. 1 is a flow diagram, showing the path of the fluid which is to be heated.

Referring to FIG. 1, an engine 2 is coupled by suitable transmission 4 to a heat pump 6. Air is taken into the heat pump from the atomsphere, cooled and exhausted to atmosphere once more. The air is cooled by the heat pump using a conventional compression/expansion cycle. A fluid enters the heat pump at 8 and absorbs heat from the air during the compression stage of the cycle. The warmed fluid then leaves the pump at 10 and is passed into the cooling system of the engine 2 at 12 to absorb waste heat from the engine cycle. The heated fluid then leaves the cooling system at 14 and is passed into a space-heating system in which it loses heat to the air in the space being heated, returning, cooled, to the system at 16 to be recycled.

Figure 2:
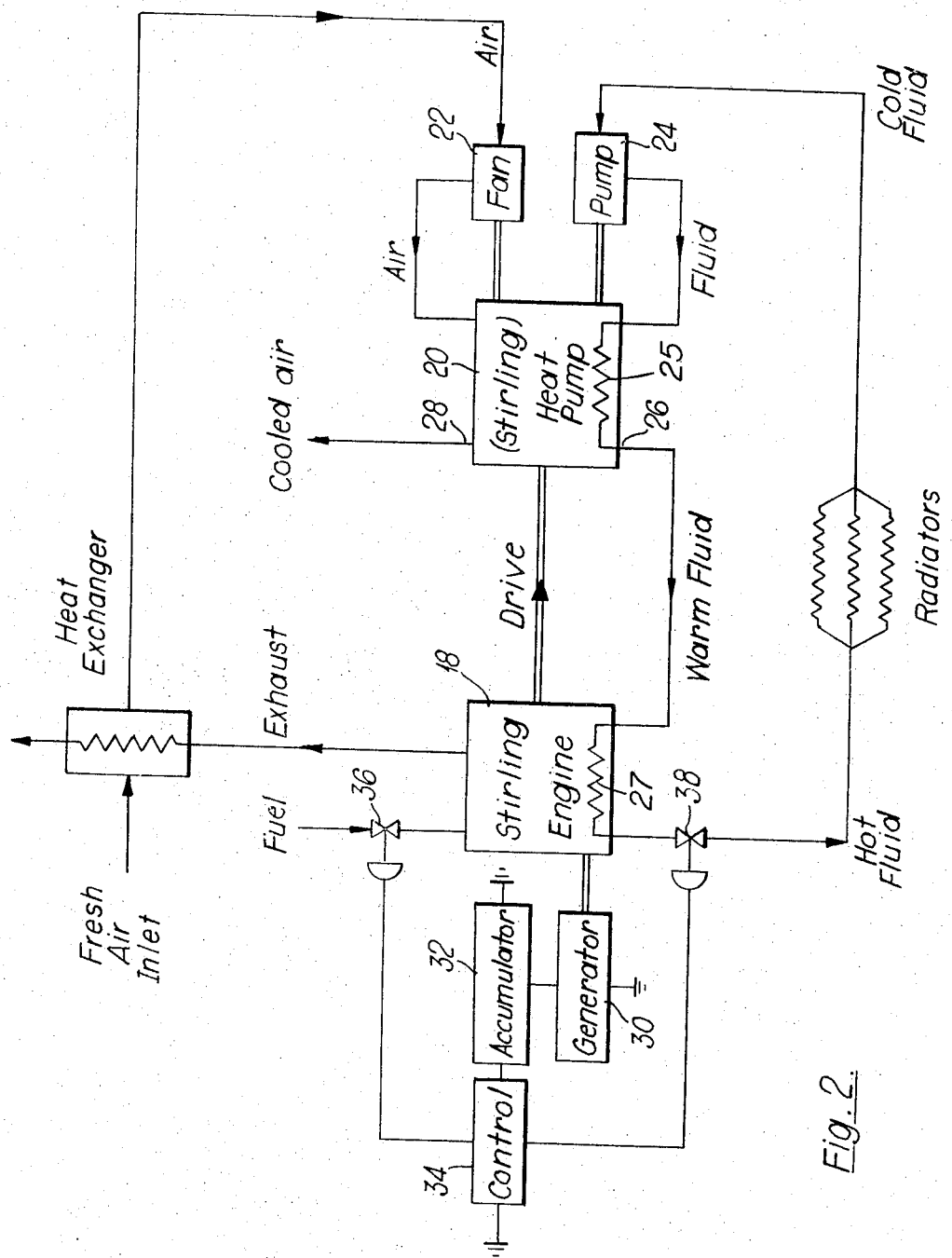
FIG. 2 shows diagrammatically, the layout of a preferred form of the apparatus with its auxiliary equipment.

FIG. 2 shows the preferred form of the invention in which a Stirling engine drives a heat pump 20 which may also be a Stirling type. Air is passed into the heat pump by a fan 22 and fluid by a pump 24. The fluid is warmed in a heat transfer circuit 25 and the warmed fluid leaves the heat pump at 26 and is passed to the cooling system 27 of the engine, whilst cooled air is exhausted from the heat pump at 28.

The Stirling engine 18 also drives a generator 30 which is arranged to charge an accumulator 32, for powering a control unit 34. The control unit 34 operates valves 36 and 38 in the fuel line and the hot fluid outlet respectively, to control the running and output of the system.

FIG. 3 shows diagrammatically the layout of the synchronising gears and connecting shafts of a system including a single cylinder engine and a single cylinder heat pump, each having its own rhombic drives. The disposition of the cylinders is horizontally opposed as indicated by the arrow 40 and 42 respectively.

The two meshing timing or synchronising gears 44 and 46 for the rhombic drive of the engine are mounted in a crankcase or shafts 48 and 50 respectively. Mounted on the same shafts are two intermeshing timing gears 52 and 54 for the heat pump drive. A smaller gear 58 meshes with the gear 46 and is mounted on a shaft 56 so as to drive the shaft at a suitable speed for an electric generator, for example.

A small gear 60 may also, or alternatively, be mounted on the shaft 50, as shown, to drive a gear 62 mounted on a shaft 64 providing a lower speed output for other auxiliary devices requiring a low speed drive, or for linking the apparatus to further similar units.

FIG. 6 shows an alternative arrangement in which the cylinders of the engine and heat pump whose positions are indicated by arrows 66 and 68 are arranged in 90° "vee." In this case two gear wheels for the engines rhombic drive are mounted on shafts 74 and 76 and the gear wheels 78 and 80 of the heat pump drive are mounted on separate shafts 82 and 84. The two rhombic drives are connected together by means of a gear 86 mounted on a shaft 88, which meshes with two small gears 90 and 92 on the shafts 76 and 82 of the engine and heat pump respectively. This kind of layout is preferable to that of FIG. 3 when the heat pump is required to run at a different speed to the engine, or has differently sized timing wheels. By suitable positioning of the shaft 88, it is envisaged that arrangements of three, four or more cylinders in a radial configuration could be obtained or the cylinders of the engine could be "banked" with their rhombic drives or common shafts, driving a similar bank of heat pump cylinders.

Figure 7:
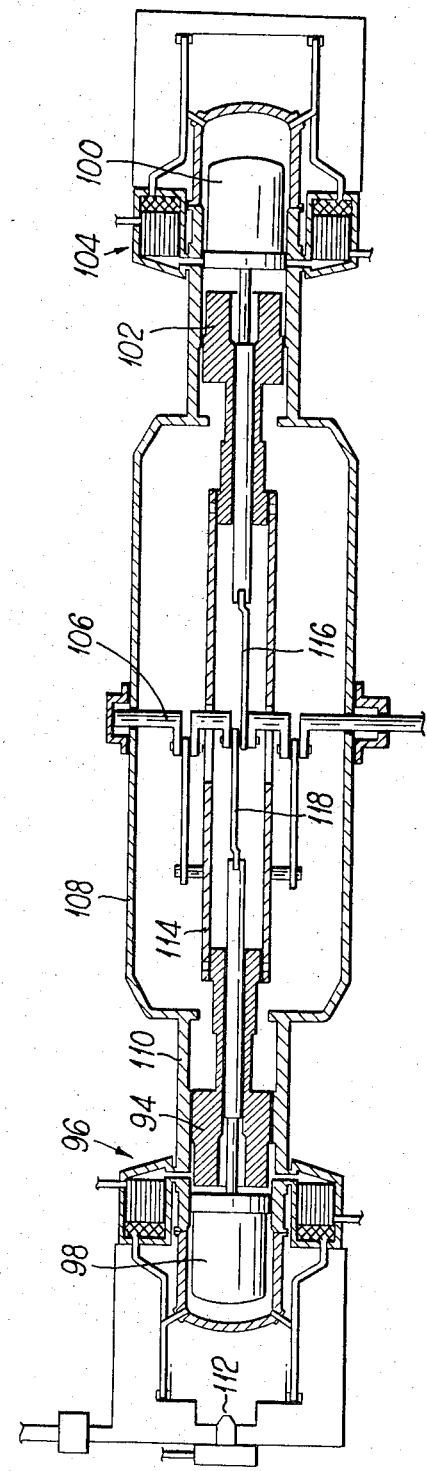
FIG. 7 shows a simplified cross-section through a crankshaft driven horizontally opposed arrangement.

In an alternative arrangement shown in FIG. 7, the heat pump may be driven from the engine by means of a crankshaft. This figure shows, in simplified form a horizontally opposed arrangement in which the piston 94 of a Stirling engine 96 drives its own displacer 98, and the displacer 100 and piston 102, of a heat pump 104 by means of a crankshaft 106, the whole assembly being contained in a single housing 108.

The piston 94 and displacer 98 of the Stirling engine reciprocate in a cylinder 110 the excess heat produced by the fuel burner 112 which is not converted into shaft power, is passed into a cooling fluid which also circulates through the heat pump to be heated.

The piston 94 of the engine drives the crankshaft 106 through a connecting sleeve 114 which is also connected directly to the piston 102 of the heat pump 104. The crankshaft is in turn connected by means of connecting rods 116 and 118 to the heat pump and engine displacers respectively.

The system uses both the shaft power output and the "waste" heat output of the driving engine, and the Stirling engine may have a shaft power output efficiency of up to 50 percent whilst a further 35 percent – 40 percent of the input energy is passed to the cooling fluid. Thus a total of up to 90 percent of the input energy can ultimately be utilised for heating the fluid, plus the heat absorbed from the surrounding atmosphere by the heat pump giving the system a very high overall efficiency.

In order to further improve the efficiency of the system the exhaust gases of the engine may be fed to the air inlet of the heat pump (when is being extracted from the atmosphere) but of course this cannot be done if it is intended to use the cold air output for air conditioning purposes for example. As an alternative therefore the hot gas may be passed into a heat exchanger in which it gives up heat to the fluid leaving the heat pump, so that the heat exchanger is "in parallel" with the heat pump.

In the preferred form of the invention as illustrated, it is believed that the use of both a Stirling engine for the drive unit and a Stirling engine for the heat pump unit, would enable the equipment to be mass-produced more economically (since certain parts might be common to both machines) and would simplify the arrangements for coupling the units together.

I claim:

1. Apparatus for heating a fluid comprising:
   a. A Stirling cycle hot gas engine including at least one fuel-heated head and cylinder, housing piston and displacer means operatively located with respect to duct means communicating with both sides of the displacer means, and the engine having a surrounding integrally connected cooling system for receiving fluid;
   b. a Stirling cycle heat pump including at least one head and cylinder housing piston and displacer means operatively located with respect to duct means communicating with both sides of the displacer means, and the pump having a surrounding integrally connected heat transfer circuit for receiving fluid;
   c. drive means interconnecting said piston and displacer means such that the engine drives the pump; and
   d. fluid circuit means for containing and circulating said fluid, the fluid circuit means connecting the integral cooling system of the engine and the integral heat transfer circuit of the pump directly in series.

2. Apparatus as claimed in claim 1, wherein said fluid circuit means includes radiator means through which fluid from the cooling system and heat transfer circuit is circulated.

3. Apparatus as claimed in claim 2, wherein said fluid circuit means includes a fluid circulating pump in series with said radiator means, said cooling system and said heat transfer circuit.

4. Apparatus as claimed in claim 1, including a common crank case connecting said engine and said heat pump and housing said drive means.

5. Apparatus as claimed in claim 1, wherein said drive means includes a crank shaft, and multiple connecting rods respectively connecting said piston means and said displacer means to said crankshaft.

6. Apparatus as claimed in claim 1, wherein the cylinder of the engine and the heat pump are horizontally opposed and supported on a common crank case housing said drive means.

* * * * *